United States Patent
Sato et al.

(10) Patent No.: US 6,645,895 B2
(45) Date of Patent: *Nov. 11, 2003

(54) METHOD OF PRODUCING CERAMIC COMPOSITION AND METHOD OF PRODUCING ELECTRONIC DEVICE

(75) Inventors: Akira Sato, Tokyo (JP); Yasuo Watanabe, Tokyo (JP); Takashi Fukui, Tokyo (JP); Mikio Takahashi, Tokyo (JP)

(73) Assignee: TDK Corporation, Tokyo (JP)

( * ) Notice: Subject to any disclaimer, the term of this patent is extended or adjusted under 35 U.S.C. 154(b) by 31 days.

This patent is subject to a terminal disclaimer.

(21) Appl. No.: 09/810,617

(22) Filed: Mar. 19, 2001

(65) Prior Publication Data

US 2001/0039238 A1 Nov. 8, 2001

(30) Foreign Application Priority Data

Mar. 30, 2000 (JP) ........................ 2000-093415
Jul. 6, 2000 (JP) ........................ 2000-204723

(51) Int. Cl.⁷ ................. C04B 35/465; C04B 35/47
(52) U.S. Cl. ...................................... 501/136
(58) Field of Search ........................ 501/136

(56) References Cited

U.S. PATENT DOCUMENTS

| | | | |
|---|---|---|---|
| 4,309,295 A | | 1/1982 | McSweeney |
| 4,839,097 A | * | 6/1989 | Noi et al. ............ 252/520.21 |
| 4,889,837 A | * | 12/1989 | Ono et al. ............ 252/520.21 |
| 6,118,648 A | * | 9/2000 | Kojima et al. ............ 361/311 |

FOREIGN PATENT DOCUMENTS

| | | |
|---|---|---|
| DE | 4009956 A1 | 10/1991 |
| EP | 0 244 300 A1 | 11/1987 |
| JP | 59-227769 A | 12/1984 |
| JP | 62-24388 B2 | 5/1987 |
| JP | 63-224106 A | 9/1988 |
| JP | 63-224108 A | 9/1988 |
| JP | 63-224109 A | 9/1988 |
| JP | 03-097669 | 4/1991 |
| JP | 4-14704 A | 1/1992 |
| JP | 4-206109 A | 7/1992 |
| JP | 5-18201 B2 | 3/1993 |
| JP | 07-211138 | 11/1995 |
| JP | 08-301657 | 11/1996 |
| JP | 08-301658 | 11/1996 |
| JP | 09-077555 | 3/1997 |
| JP | 2001-247364 | 9/2001 |

OTHER PUBLICATIONS

U.S. patent application Ser. No. 09/778,792, Fukui et al., filed Feb. 8, 2001.

* cited by examiner

Primary Examiner—David Brunsman
(74) Attorney, Agent, or Firm—Oliff & Berridge, PLC (57) ABSTRACT

A method of producing an electronic device comprising a dielectric layer constituted by a dielectric ceramic composition containing a main component expressed by a composition formula of $\{(Sr_{1-x}Ca_x)O\}_m \cdot (Ti_{1-y}Zr_y)O_2$, wherein the mole ratio m satisfies $0.94<m<1.08$, the code x satisfies $0 \leq x \leq 1.00$ and the code y satisfies $0 \leq y \leq 0.20$; and a fourth subcomponent including an oxide of R (note that R is at least one of rare-earth element); characterized by producing the dielectric ceramic composition by using a composition source material wherein at least a part of a source material for the fourth subcomponent is brought to react with a source material for the main component. According to the method, it is possible to produce an electronic device, such as a chip capacitor, having excellent resistance to reducing during firing and excellent capacity-temperature characteristics after firing, wherein an accelerating lifetime of insulation resistance is improved and thus the credibility is improved.

8 Claims, 1 Drawing Sheet

METHOD OF PRODUCING CERAMIC COMPOSITION AND METHOD OF PRODUCING ELECTRONIC DEVICE

BACKGROUND OF THE INVENTION

1. Field of the Invention

The present invention relates to a method of producing a dielectric ceramic composition used, for example, as a dielectric layer of a multi-layer ceramic capacitor and a method of producing an electronic device using the dielectric ceramic composition as a dielectric layer.

2. Description of the Related Art

A multi-layer ceramic capacitor as an example of electronic devices is formed by printing a conductive paste on a green sheet comprised of a predetermined dielectric ceramic composition, layering a plurality of the green sheets printed the conductive paste thereon and firing the green sheet and internal electrodes as one body.

A dielectric ceramic composition had a characteristic that it was reduced and became semiconductive when fired in a neutral or reducing atmosphere having a low oxygen partial pressure. Therefore, when producing a multi-layer ceramic capacitor, it was inevitable to fire in an oxidizing atmosphere having a high oxygen partial pressure. Accordingly, as an internal electrode material to be fired at a time with the dielectric ceramic composition, it is necessary to use an expensive noble metal, such as palladium and platinum, which does not melt at a temperature of sintering the dielectric ceramic composition and is not oxidized when being fired in an oxidizing atmosphere, so it has been a large obstacle for lowering the cost of the multi-layer ceramic capacitor to be produced.

On the other hand, to use an inexpensive base metal, such as nickel and copper, as an internal electrode material, it is necessary to develop a dielectric ceramic composition having characteristics of not becoming semiconductive by being fired at a low temperature in a neutral or reducing atmosphere, that is having excellent resistance to reducing, showing sufficient specific dielectric constant and excellent dielectric characteristics (for example, having a small capacity-temperature change rate) after firing.

A variety of proposals have been made for dielectric ceramic composition wherein a base metal can be used as an internal electrode material in the related art.

For example, The Japanese Unexamined Patent Publication No. 1988-224108 discloses a dielectric ceramic composition containing as a main component a dielectric oxide having a composition expressed by $(Sr_{1-x}Ca_x)_m(Ti_{1-y}Zr_y)O_3$ (note that $0.30 \leq x \leq 0.50$, $0.03 \leq y \leq 0.20$, $0.95 \leq m \leq 1.08$) and containing as subcomponents 0.01 to 2.00 parts by weight of Mn (converted to $MnO_2$) and 0.10 to 4.00 parts by weight of $SiO_2$ with respect to 100 parts by weight of the main component.

The Japanese Unexamined Patent Publication No. 1988-224109 discloses a dielectric ceramic composition further containing ZnO in an amount of 0.01 to 1.00 parts by weight with respect to the above main component in addition to the above Mn and $SiO_2$.

The Japanese Unexamined Patent Publication No. 1992-206109 discloses a dielectric ceramic composition containing as a main component a dielectric oxide having a composition expressed by $(Sr_{1-x}Ca_x)_m(Ti_{1-y}Zr_y)O_3$ (note that $0.30 \leq x \leq 0.50$, $0.00 \leq y \leq 0.20$, $0.95 \leq m \leq 1.08$) and the particle diameter is made to be in the range of 0.1 to 1.0 μm.

The Japanese Examined Patent Publication No. 1987-24388 discloses a dielectric ceramic composition containing as a main component a dielectric oxide having a composition expressed by $MeO_k \cdot TiO_2$ (note that Me is a metal selected from Sr, Ca and Sr+Ca, and k is 1.00 to 1.04) and 0.2 to 10.0 parts by weight of a glass component with respect to 100 parts by weight of the main component wherein $Li_2O$, M (note that M is at least one kind of metal oxide selected from BaO, CaO and SrO) and $SiO_2$ are used at a predetermined mole ratio.

The Japanese Unexamined Patent Publication No. 1984-227769 discloses a dielectric ceramic composition containing as a main component a dielectric oxide having a composition expressed by $\{(Sr_{1-x}Ca_x)O\}_k \cdot TiO_2$ (note that $0 \leq x \leq 1.00$, $1.00 \leq k \leq 1.04$) and 0.2 to 10.0 parts by weight of a glass component with respect to 100 parts by weight of the main component wherein $Li_2O$, M (note that M is at least one kind of metal oxide selected from BaO, Cao and SrO) and $SiO_2$ are used at a predetermined mole ratio.

The Japanese Unexamined Patent Publication No. 1988-224106 discloses a dielectric ceramic composition containing as a main component a dielectric oxide having a composition expressed by $(Sr_{1-x}Ca_x)_m(Ti_{1-y}Zr_y)O_3$ (note that $0.30 \leq x \leq 0.50$, $0.03 \leq y \leq 0.20$, $0.95 \leq m \leq 1.08$) and containing as a subcomponent 0.01 to 2.00 parts by weight of Mn (converted to $MnO_2$), 0.10 to 4.00 parts by weight of $SiO_2$ and 0.01 to 1.00 parts by weight of Mo (converted to MoO) with respect to 100 parts by weight of the main component.

The Japanese Unexamined Patent Publication No. 1992-14704 discloses a dielectric ceramic composition containing as a main component a dielectric oxide having a composition expressed by $(Sr_xCa_{1-x})(Zr_yTi_{1-y})O_3$ (note that $0.59 \leq x \leq 0.65$, $0 \leq y \leq 0.1$) and containing less than 3.0 parts by weight of $SiO_2$ (note that 0 part by weight is not included) with respect to 100 parts by weight of the main component.

There have been disadvantages, however, that when producing the dielectric ceramic composition described in the publications in a usual method, an accelerating lifetime of insulation resistance after firing is insufficient in all cases, while, when producing a multi-layer ceramic capacitor having an internal electrode made by a base metal, such as nickel, by using the dielectric ceramic composition, the multi-layer ceramic capacitor to be obtained has lower credibility.

Note that the present inventors have proposed to add a rare-earth component, such as yttrium, in a composition system expressed by $\{(Sr_{1-x}Ca_x)O\}_m \cdot (Ti_{1-y}Zr_y)O_2$ wherein the mole ratio m is relatively low so that the accelerating lifetime of insulation resistance is improved (The Japanese Patent Application No. 2000-187800). However, when producing in a usual method, it was difficult to attain a longer lifetime even by adding a rare-earth component in a range where the mole ratio m satisfies $0.995 \leq m < 1.08$ which is relatively high.

SUMMARY OF THE INVENTION

An object of the present invention is to provide a method of producing a dielectric ceramic composition having excellent resistance to reducing during firing and excellent capacity-temperature characteristics after firing, which furthermore improves an accelerating lifetime of insulation resistance and a method of producing an electronic device, such as a chip capacitor, having improved credibility.

To attain the above object, according to the present invention, there is provided a method of producing a dielectric ceramic composition containing a main component expressed by a composition formula of $\{(Sr_{1-x}Ca_x)O\}_m \cdot (Ti_{1-y}Zr_y)O_2$ wherein the mole ratio m satisfies $0.94<m<1.08$, the code x satisfies $0\leq x\leq 1.00$ and the code y satisfies $0\leq y\leq 0.20$; and a fourth subcomponent including an oxide of R (note that R is at least one selected from Sc, Y, La, Ce, Pr, Nd, Pm, Sm, Eu, Gd, Tb, Dy, Ho, Er, Tm, Yb and Lu);

characterized by producing the dielectric ceramic composition by using a composition source material wherein at least a part of a fourth subcomponent source material for the fourth subcomponent is brought to react in advance with a main component source material for the main component.

According to the present invention, there is provided a method of producing an electronic device comprising a dielectric layer constituted by a dielectric ceramic composition containing a main component expressed by a composition formula of $\{(Sr_{1-x}Ca_x)O\}_m \cdot (Ti_{1-y}Zr_y)O_2$, wherein the mole ratio m satisfies $0.94<m<1.08$, the code x satisfies $0\leq x\leq 1.00$ and the code y satisfies $0\leq y\leq 0.20$; and a fourth subcomponent including an oxide of R (note that R is at least one selected from Sc, Y, La, Ce, Pr, Nd, Pm, Sm, Eu, Gd, Tb, Dy, Ho, Er, Tm, Yb and Lu);

characterized by producing the dielectric ceramic composition by using a composition source material wherein at least a part of a fourth subcomponent source material for the fourth subcomponent is brought to react in advance with a main component source material for the main component.

It is considered that a distribution of the fourth subcomponent becomes more uniform (solute state) after firing by bringing at least a part of the fourth subcomponent source material react with the main component source material in advance.

Preferably, the oxide of R included in the fourth subcomponent material is at least one oxide of Sc, Y, Ce, Dy, Ho, Er, Tm, Yb and Lu.

A method of the reaction is not limited to a solid phase method, such as a calcining method, but a liquid phase method, such as an oxalate method, hydrothermal synthesis method, sol-gel method, etc. may be used. Note that the description "at least a part" means at least a part of the fourth subcomponent source material corresponding to the whole amount of the fourth subcomponent to be contained in the final composition. Note that the whole amount of the fourth subcomponent to be contained in the final composition is preferably reacted.

Preferably, the fourth subcomponent source material is brought to react in advance in an amount of 0.02 mole or more and less than 2 moles (calculated as a conversion mole value of the R in the oxide) with respect to 100 moles of the main component source material.

Preferably, the main component source material is expressed by a composition formula of $\{(Sr_{1-x}Ca_x)O\}_{m'} \cdot (Ti_{1-y}Zr_y)O_2$ and the mole ratio m' in said composition formula with respect to the mole ratio m of the final composition satisfies $m'\leq m$.

Preferably, the dielectric ceramic composition is produced by firing after adding to said composition source material a substance containing at least one element of Sr and Ca.

More preferably, the dielectric ceramic composition is produced by firing after adding to said composition source material a substance containing at least one element of Sr and Ca without adding a substance containing Ti.

Preferably, the mole ratio m' of the composition formula in the main component source material satisfies $0.9<m'$.

It has been proven by the present inventors that it is difficult to improve an accelerating lifetime (highly accelerated life time) of insulation resistance when producing by a usual method a dielectric ceramic composition containing a main component expressed by a composition formula of $\{(Sr_{1-x}Ca_x)O\}_m \cdot (Ti_{1-y}Zr_y)O_2$ wherein a mole ratio m satisfies $(0.995\leq m<1.08)$ and a particular fourth subcomponent. The reason thereof is considered that R or an oxide of R in the fourth subcomponent source material segregates much at a grain boundary portion and at a triple point in the dielectric ceramic composition after firing and is not uniformly distributed in the grains.

In the method of producing a dielectric ceramic composition according to the present invention, by producing the above dielectric ceramic composition by using a composition source material wherein at least a part of the fourth subcomponent source material is brought to react with a main component source material in advance, it is possible to produce a dielectric ceramic composition having resistance to reducing during firing, excellent capacity-temperature characteristics after firing, and furthermore, an accelerating lifetime of insulation resistance (for example, 200° C. and DC8V/μm) due to a uniform distribution of R or an oxide of R of the fourth component material in the grain boundary in the dielectric ceramic composition after firing.

Particularly, when using a main component source material expressed by a composition formula of $\{(Sr_{1-x}Ca_x)O\}_{m'} \cdot (Ti_{1-y}Zr_y)O_2$ having a smaller mole ratio m' than the mole ratio m after firing, R or an oxide of R of the fourth subcomponent source material is more easily distributed uniformly in the dielectric ceramic composition after firing. Consequently, the accelerating lifetime of insulation resistance of the dielectric ceramic composition to be obtained improves more.

Note that it is proven by the present inventors that in the range where the mole ratio m in the above composition formula is relatively low $(0.94<m<0.995)$, the fourth subcomponent is almost uniformly distributed in the main component in the dielectric ceramic composition after firing even the fourth subcomponent source material is not brought to react with the main component source material. However, even in such a region where the mole ratio m is relatively low, it becomes easier for the fourth subcomponent source material to uniformly distributed in the grains of the main component by producing the above dielectric ceramic composition by using a component material wherein the fourth subcomponent source material is brought to react with the main component source material comparing with a case of using a material wherein the fourth subcomponent source material is not brought to react with the main component source material in advance, that is, the fourth subcomponent source material is subsequently added to the main component source material. As a result, an improvement of the accelerating lifetime of insulation resistance can be expected.

In a production method according to the present invention, an electronic device, such as a chip capacitor, having excellent capacity-temperature characteristics, an improved accelerating lifetime of insulation resistance and an improved reliability can be produced.

The present disclosure relates to subject matter contained in Japanese Patent Application No. 2000-93415 (filed on March 30) and No. 2000-204723 (filed on July 6), the disclosure of which is expressly incorporated herein by reference in its entirety.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Below, the present invention will be explained based on an embodiment shown in the drawings.

Before explaining a method of producing a dielectric ceramic composition according to the present invention, a multi-layer ceramic capacitor will be explained first.

Multi-Layer Ceramic Capacitor

Figure 1:
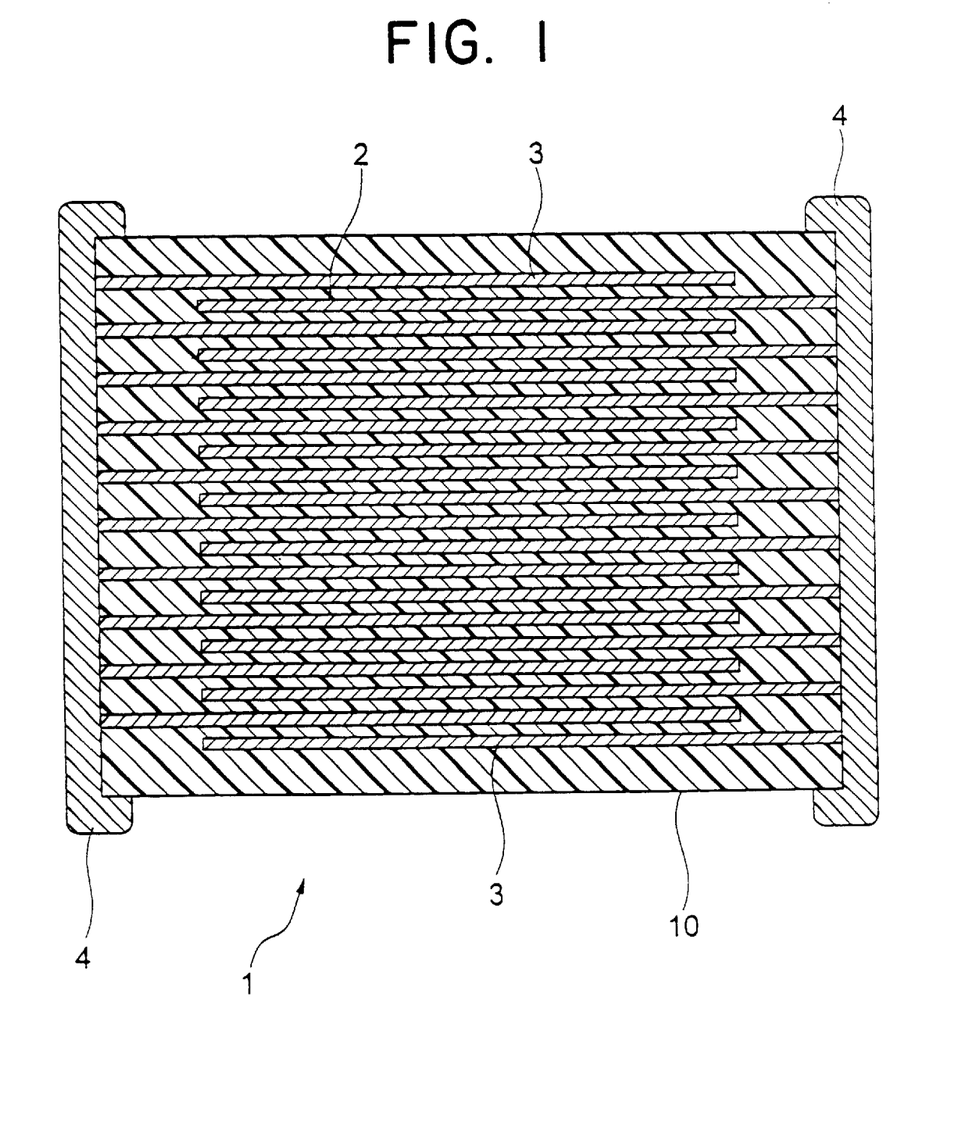
FIG. 1 is a sectional view of a multi-layer ceramic capacitor according to an embodiment of the present invention.

As shown in FIG. 1, a multi-layer ceramic capacitor 1 as an electronic device according to an embodiment of the present invention comprises a capacitor element body 10 having a configuration wherein dielectric layers 2 and internal electrode layers 3 are alternately layered.

On the both end portions of the capacitor element body 10 are formed the internal electrode layers 3 alternately arranged inside the element body 10 and a pair of external electrodes 4 being conductive to each other. A shape of the capacitor element body 10 is not specifically limited, but normally a rectangular parallelepiped shape. Also, a size thereof is not specifically limited and may be a suitable size in accordance with the application but is normally about (0.6 to 5.6 mm)×(0.3 to 5.0 mm)×(0.3 to 1.9 mm).

The internal electrode layers 3 are layered so that the respective end surfaces are alternately exposed to surfaces of facing two end portions of the capacitor element body 10. The pair of external electrodes 4 are formed on the both end portions of the capacitor element body 10 and connected to the exposed end surfaces of the alternately arranged internal electrode layers 3 to configure a capacitor circuit.

Dielectric Layer 2

The dielectric layer 2 contains a dielectric ceramic composition obtained by a method of producing the present invention. The dielectric ceramic composition contains a main component expressed by a composition formula of $\{(Sr_{1-x}Ca_x)O\}_m \cdot (Ti_{1-y}Zr_y)O_2$. At this time, an oxygen (O) amount may be a little different from the stoichiometric composition of the above formula.

In the above formula, the code x satisfies $0 \leq x \leq 1.00$, preferably, $0.30 \leq x \leq 0.50$. The X expresses the number of Ca atoms, and by changing x, that is changing a Ca/Sr ratio, a phase transition point of a crystal can be freely shifted. Therefore, a capacity-temperature coefficient and a specific dielectric constant can be freely controlled. When x is made to be within the above range, the phase transition point comes close to a room temperature and temperature characteristics of a capacitance can be improved. Note that the ratio of Sr and Ca can be any and only one of the two may be contained in the present invention.

In the above formula, a code y satisfies $0 \leq y \leq 0.20$, preferably, $0 \leq y \leq 0.10$. By making y not more than 0.20, declining of a specific dielectric constant can be prevented. The y indicates the number of Zr atoms, and there is a tendency that resistance to reducing is further increased by exchanging $ZrO_2$ which is harder to be reduced comparing with $TiO_2$. Note that the present invention does not necessarily contain Zr and may contain only Ti.

In the above formula, it is sufficient that a mole ratio m is more than 0.94, preferably, $0.995 \leq m < 1.08$. By making m larger than 0.94, becoming semiconductive due to being fired in a reducing atmosphere can be prevented, particularly, by making m 0.995 or more, a longer lifetime is attained by reducing an oxygen partial pressure during firing. While, by making m less than 1.08, a densified sintered body can be obtained without making the firing temperature higher.

The dielectric ceramic composition according to the present invention also contains a fourth subcomponent containing an oxide of R (note that R is at least one selected from Sc, Y, La, Ce, Pr, Nd, Pm, Sm, Eu, Gd, Tb, Dy, Ho, Er, Tm, Yb and Lu) in addition to the main component expressed by the above composition formula. The fourth subcomponent has not only an effect of improving the highly accelerated life time (accelerating lifetime of insulation resistance) but an effect of improving a defect rate of initial insulation resistance (IR) when the dielectric is made to be a thin layer (for example, about 4 μm). In terms of the improvement of the defect rate (a non-defect rate of the initial IR is preferably 15% or more), it is preferable that an oxide of at least one of Sc, Y, Ce, Dy, Ho, Er, Tm, Yb and Lu is included.

Even in the range of $0.995 \leq m < 1.08$, that is, the mole ratio m of the main component is relatively high, by adding a predetermined amount of the fourth subcomponent at a later explained timing, the accelerating lifetime (highly accelerated life time) of the insulation resistance of the dielectric layer 2 can be improved without deteriorating the dielectric characteristics and reliability of a multi-layer ceramic capacitor 1 to be obtained can be widely improved. Note that even in the range of $0.94 < m < 0.995$, that is, the mole ratio m of the main component is relatively low, by adding a predetermined amount of the fourth subcomponent at a later explained timing, an improvement of the accelerating lifetime (highly accelerated life time) of the insulation resistance of the dielectric layer 2 is observed comparing with a case where the fourth subcomponent is not added at the later explained timing.

The ratio of the fourth subcomponent to 100 moles of the main component is 0.02 mole ≤ fourth subcomponent < 2 moles, preferably, 0.02 ≤ fourth subcomponent ≤ 0.6, wherein the ratio of the fourth subcomponent is calculated as a conversion mole ratio of the R in the oxide. By making the ratio of the fourth subcomponent within the range, the accelerating lifetime of the insulation resistance in the range where the mole ratio m of the main component is relatively high can be particularly improved.

In the present invention, it is preferable that an oxide of R contained in the above fourth subcomponent includes grains substantially uniformly distributed in the grains. In the present invention, it is a substance containing a predetermined amount of the fourth subcomponent with respect to the above main component, which results in furthermore effectiveness in improving the accelerating lifetime of the insulation resistance as a result that R or an oxide of R in the fourth subcomponent includes grains substantially uniformly distributed in the grains.

Note that a dielectric ceramic composition composing the dielectric layer 2 and obtained by a method of producing the present invention may be added a predetermined amount of a first subcomponent containing at least one selected from oxides of V, Nb, W, Ta and Mo and/or compounds which become oxides of the same after firing. By adding such a predetermined amount of first subcomponent, low temperature firing becomes possible without declining dielectric characteristics and accelerating lifetime (highly accelerated life time) of insulation resistance can be improved even when the dielectric layer is made to be a thin layer. When adding the first subcomponent, the ratio of the first subcomponent with respect to 100 moles of the above main component is 0.01 mole≦first subcomponent<2 moles, preferably 0.04 mole≦first subcomponent≦0.6 mole, wherein the ratio of the first subcomponent is calculated as a conversion mole ratio of the metal element in the oxide.

The dielectric ceramic composition may be also added a predetermined amount of a second subcomponent containing an oxide of Mn (for example, MnO) and/or compound which becomes an oxide of Mn by firing (for example, $MnCO_3$). The second subcomponent brings effects of promoting sintering, improving a highly accelerated life time, and reducing the defect rate of an initial insulation resistance (IR) when the dielectric layer 2 is made to be a thin layer of, for example, about 4 $\mu$m. When adding the second subcomponent, the ratio of the second subcomponent with respect to 100 moles of the above main component is 0 mole≦second subcomponent<4 moles, preferably, 0.05 mole≦second subcomponent≦1.4 moles, wherein the ratio of the second subcomponent is calculated as a conversion mole ratio of the metal element in the oxide.

Furthermore, the dielectric ceramic composition may be added a predetermined amount of a third subcomponent containing at least one selected from $SiO_2$, MO (note that M is at least one element selected from Ba, Ca, Sr and Mg), $Li_2O$ and $B_2O_3$. The third subcomponent acts mainly as a sintering auxiliary agent. When adding the third subcomponent, the ratio of the third subcomponent with respect to 100 moles of the above main component is 0 mole<third subcomponent<15 moles, preferably 0.2 mole≦third subcomponent≦6 moles, wherein the ratio of the third subcomponent is calculated as a conversion mole ratio of the oxide.

Note that conditions, such as the number of stacked layers, a thickness of the dielectric layer 2, etc. shown in FIG. 1, may be suitably determined in accordance with an object and application. Also, the dielectric layer 2 is comprised of grains and grain boundary phase. An average grain diameter of the grains of the dielectric layer 2 is preferably about 1 to 5 $\mu$m. This grain boundary phase normally contains as components an oxide of a material composing the dielectric material or internal electrode material, an oxide of a separately added material and furthermore an oxide of a material to be mixed as an impurity during the process, and configured by a normal glass or a vitreous material.

Internal Electrode Layer 3

The electroconductive material contained in the internal electrode layers 3 is not particularly limited, but a base metal may be used since the material constituting the dielectric layers 2 has resistance to reducing. As the base metal used as the electroconductive material, Ni or an Ni alloy is preferable. As the Ni alloy, an alloy of at least one type of element selected from Mn, Cr, Co, and Al with Ni is preferable. The content of the Ni in the alloy is preferably not less than 95 wt %. Note that the Ni or Ni alloy may contain P, Fe, Mg and other various types of trace components in an amount of not more than 0.1 wt % or so. The thickness of the internal electrode layer may be suitably determined in accordance with the application etc., but is usually 0.5 to 5 $\mu$m, in particular 1 to 2.5 $\mu$m or so is preferable.

External Electrodes 4

The electroconductive material contained in the external electrodes 4 is not particularly limited, but usually Cu, Cu alloy, Ni, or Ni alloy, etc. is used. Note that of course Ag, Ag—Pd alloy, etc. can be also used. Note that inexpensive Ni, Cu, or alloys of the same are used in the present invention. The thickness of the external electrodes may be suitably determined in accordance with the application etc., but usually 10 to 50 $\mu$m or so is preferable.

Method of Producing Multi-Layer Ceramic Capacitor

The multi-layer ceramic capacitor 1 produced by using a method of producing the dielectric ceramic composition according to the present invention is produced by preparing a green chip by the usual printing method or sheet method which uses pastes, sintering the green chip, then printing or transferring the external electrodes and sintering the same. The method of producing the multi-layer ceramic capacitor 1 will be explained in detail below. A dielectric layer paste, internal electrode paste and external electrode paste are separately produced.

Dielectric Layer Paste

First, a dielectric ceramic composition source material contained in the dielectric layer paste is prepared. In the present invention, the dielectric ceramic composition source material contains a composition source material wherein the fourth subcomponent source material is brought to react with the main component source material. Note that the fourth subcomponent source material in the main component source material is considered to be in a solute state therein.

As the fourth subcomponent source material, an oxide of R (note that R is at least one selected from Sc, Y, La, Ce, Pr, Nd, Pm, Sm, Eu, Gd, Tb, Dy, Ho, Er, Tm, Yb and Lu) may be mentioned. In terms of a defect rate improvement, it is preferable to include at least one oxide of Sc, Y, Ce, Dy, Ho, Er, Tm, Yb and Lu.

In the present embodiment, a material expressed by a composition formula of $\{(Sr_{1-x}Ca_x)O\}_{m'} \cdot (Ti_{1-y}Zr_y)O_2$ is used as a main component source material. Also, the mole ratio m' of the above composition formula is made smaller than the mole ratio m of the oxide in the composition formula in the dielectric ceramic composition expressed by a composition formula of $\{(Sr_{1-x}Ca_x)O\}_m \cdot (Ti_{1-y}Zr_y)O_2$ after firing (m'<m). Note that in the present invention, the mole ratio m' in a material stage and the mole ratio m in the dielectric ceramic composition after firing may be set to be same (m'=m). By setting the mole ratio m' in the material stage smaller than the mole ratio m after firing, R or an oxide of R of the fourth subcomponent source material becomes more easily distributed uniformly in the grain boundary in the dielectric ceramic composition after firing which composes the dielectric layer 2. Thus, the accelerating lifetime of insulation resistance of the dielectric ceramic composition to be obtained can be furthermore improved.

The lowest limit of the mole ratio m' is preferably set to be larger than 0.9, more preferably, 0.92≦m'≦1.0 6, furthermore preferably, 0.92≦m'≦1.02, in particular, 0.94≦m'≦1.00 due to a reason of preventing it from becoming semiconductive.

Such a main component source material expressed by the composition formula of $\{(Sr_{1-x}Ca_x)O\}_{m'} \cdot (Ti_{1-y}Zr_y)O_2$ may be obtained by a so-called liquid phase method besides a so-called solid phase method. The solid phase method is a method of obtaining the material, when using, for example, $SrCO_3$, $CaCO_3$, $TiO_2$ and $ZrO_2$ as starting materials, by measuring predetermined amounts of the same, mixing, calcining, and grinding. As the liquid phase method, an oxalate method, hydrothermal synthesis method, sol-gel method, etc. can be mentioned. Note that when compounding the material by combining [a] moles of $Sr_tTiO_3$, [b] moles of $Ca_{t'}TiO_3$, [c] moles of $Sr_{t''}ZrO_3$ and [d] moles of $Ca_{t'''}ZrO_3$, m' can be obtained by m'=(at+bt'+ct"+dt''')/(a+b+c+d).

To bring the fourth subcomponent source material react with the main component source material, a method may be taken wherein the fourth subcomponent source material is mixed in the starting material to obtain the above composition source material by a solid phase method or liquid phase method at the time of producing the above main component source material. Alternately, another method may be taken wherein the above main component source material is produced by the solid phase method or liquid phase method and the fourth subcomponent source material may be added thereto to obtain the above composition source material. In either way, a composition source material is obtained by bringing the fourth subcomponent source material react in advance in the range of preferably 0.02 mole or more and less than 2 moles, more preferably, 0.02 mole or more and less than 0.6 mole, converted to R in the oxide, with respect to 100 moles of the main component source material. By setting the content quantity of the fourth subcomponent source material within the range, the accelerating lifetime of insulation resistance of the dielectric ceramic composition to be obtained can be improved.

Below, a method of obtaining the composition source material by bringing the fourth subcomponent source material react at the time of producing the main component source material by a solid phase method will be explained as an example.

First, a material before calcining will be prepared by measuring a predetermined amounts of the fourth subcomponent source material, for example, $Y_2O_3$ besides respective main component source materials, such as $SrCO_3$, $CaCO_3$, $TiO_2$, $ZrO_2$, mixing and drying the same so as to attain a predetermined m'.

Next, the prepared material before calcining is subjected to calcining. Conditions of the calcining is not specifically limited but it is preferable to carry it out under conditions below. A temperature rise rate is preferably 50 to 400° C./hour, more preferably 100 to 300° C./hour. A holding temperature is preferably 500 to 1200° C., more preferably 700 to 1100° C. A temperature holding time is preferably 0.5 to 6 hours, more preferably 1 to 3. a processing atmosphere is any one of the air, a nitrogen and reducing atmosphere.

The material after calcining is roughly grinded by an alumina roll etc., it is mixed with material powder so as to attain the composition formula of $\{(Sr_{1-x}Ca_x)O\}_m \cdot (Ti_{1-y}Zr_y)O_2$ of the final product. At this time, first to third subcomponents source materials may be added in accordance with need. Note that the above first to third subcomponent source materials may be added before the calcining.

As the first subcomponent source material, at least one kind of a single oxide or composite oxide selected from oxides of V, Nb, W, Ta and Mo and/or compounds which becomes oxides of the same after firing is used.

As the second subcomponent source material, at least one kind of a single oxide or composite oxide selected from an oxide of Mn and/or compounds which becomes an oxide of Mn after firing is used.

As the third subcomponent source material, at least one kind selected from $SiO_2$, MO (note that M is at least one kind of element selected from Ba, Ca, Sr and Mg), $Li_2O$ and $B_2O_3$ is used.

In the present embodiment, since m'<m (note that it may be m'=m in the present invention), the material powder to attain the composition formula of the final product is powder of a substance containing a larger amount of Sr and/or Ca than an amount of Ti and/or Zr. More preferably, the substance does not contain Ti and/or Zr but contains Sr and/or Ca.

Then, in accordance with need, the mixed powder is mixed by a ball mill, etc. dried so that the dielectric ceramic composition source material having the composition of the present invention.

Namely, in the present invention, by using the dielectric ceramic composition source material containing a composition source material obtained by bringing at least a part of the fourth component source material react with the main component source material and subjecting the same to later explained firing, R or an oxide of R in the fourth subcomponent source material does not segregate to the grain boundary portion or a triple point in the dielectric ceramic composition after the firing and is uniformly distributed in the grains, consequently, the accelerating lifetime of insulation resistance can be improved.

Particularly in the present embodiment, the mole ratio m' of the main component source material is set to be smaller than the mole ratio m after firing, the composition source material is produced by bringing at least a part of the fourth subcomponent source material at this stage, then, a predetermined amount of a source material which is insufficient with respect to the final composition is subsequently added to attain the final composition so as to obtain the dielectric ceramic composition source material.

By firing the thus prepared source material, R of the fourth subcomponent source material becomes easier to be uniformly distributed in the grain boundary of the dielectric ceramic composition after firing.

Note that as a compound which becomes an oxide due to firing, for example, carbonates, nitrates, oxalates, and organic metal compounds can be mentioned. Of course, an oxide and a compound which becomes an oxide by firing may be used together. The content quantity of the respective compounds in the dielectric ceramic composition source material may be suitably determined so as to give the above-mentioned composition of the dielectric ceramic composition after firing. The particle diameter of the dielectric ceramic composition powder is usually about 0.0005 to 5 $\mu$m in average in a state before being made to be a paint.

Next, the dielectric ceramic composition source material is made to be paint to prepare a dielectric layer paste. The dielectric layer paste may be an organic-based paint comprised of a mixture of a dielectric ceramic composition source material and an organic vehicle and may also be a water-based paint.

The organic vehicle is comprised of a binder dissolved in an organic solvent. The binder used for the organic vehicle is not particularly limited, but may be suitably selected from ethyl cellulose, polyvinyl butyral, and other ordinary types of binders. Further, the organic solvent used at this time is also not particularly limited and may be suitably selected from terpineol, butyl carbitol, acetone, toluene, and other organic solvents in accordance with the printing method, sheet method, or other method of use.

Further, a water-based paint is a water-based binder or dispersant etc. dissolved in water. The water-based binder is not particularly limited and may be suitably selected from polyvinyl alcohol, cellulose, water-based acrylic resin, emulsion, etc.

Internal Electrode Paste, External Electrode Paste

The internal electrode layer paste is prepared by kneading the electroconductive material comprised of the above various types of dielectric metals and alloys or various types of oxides forming the above electroconductive materials after firing, an organic metal compound, resinate, etc. together with the above organic vehicle. The external electrode paste may be prepared in the same way as the above internal electrode layer paste.

The content quantity of the organic vehicle in the above pastes is not particularly limited and may fall within the usual content, for example, the binder may be contained in an amount of 1 to 5 wt % or so and the solvent 10 to 50 wt % or so. Further, the pastes may include, in accordance with need, various types of additives selected from dispersants, plasticizers, dielectrics, insulators, etc.

When using a printing method, the dielectric paste and the internal electrode layer paste are successively printed on the polyethylene terephthalate or other substrate. The result is then cut into a predetermined shape, then the pastes are peeled off from the substrate to form a green chip. On the other hand, when using a sheet method, a dielectric paste is used to form a green sheet, the internal electrode layer paste is printed on top of this, then these are layered to form a green chip.

Then, the green chip is processed to remove the binder and fired.

Binder Removing Processing

This processing for removing the binder may be performed under ordinary conditions, but when using Ni or an Ni alloy or other base metal for the electroconductive material of the internal electrode layer, this is preferably performed under the conditions that in the air atmosphere, the rate of temperature rise is 5 to 300° C./hour, in particular 10 to 100° C./hour, a holding temperature is 180 to 400° C., in particular 200 to 300° C., a temperature holding time is 0.5 to 24 hours, in particular 5 to 20 hours.

Firing

The atmosphere when firing the green chip may be suitably determined in accordance with the type of the electroconductive material in the internal electrode layer paste, but when using Ni, an Ni alloy or other base metal as the electroconductive material, the oxygen partial pressure in the firing atmosphere is preferably made $10^{-10}$ to $10^{-3}$ Pa, more preferably, $10^{-10}$ to $6 \times 10^{-5}$ Pa. If the oxygen partial pressure is too low, the electroconductive material of the internal electrode layers becomes abnormally sintered and ends up breaking in the middle, while, if the oxygen partial pressure is too high, the internal electrode layers tend to be oxidized.

The holding temperature at the time of firing is preferably 1000 to 1400° C., more preferably 1200 to 1380° C. If the holding temperature is too low, the densification becomes insufficient, while if too high, there is a tendency toward breaking of the electrodes due to abnormal sintering of the internal electrodes and deterioration of the capacity-temperature characteristic due to dispersion of the material comprising the internal electrode layers.

The various firing conditions other than the above are that preferably the rate of temperature rise is 50 to 500° C./hour, in particular 200 to 300° C./hour, a temperature holding time is 0.5 to 8 hours, in particular 1 to 3 hours, the cooling rate is 50 to 500° C./hour, in particular 200 to 300° C./hour, and the firing atmosphere is preferably a reducing atmosphere. As the atmospheric gas, for example, it is preferable to use a wet mixed gas of $N_2$ and $H_2$.

When firing in a reducing atmosphere, the sintered body of the capacitor chip is preferably annealed (heat treatment).

Annealing (Heat Treatment)

The annealing process is for re-oxidizing the dielectric layer. Due to this, the insulation resistance can be increased. The oxygen partial pressure in the annealing atmosphere is preferably not less than $10^{-4}$ Pa, more preferably, $10^{-1}$ to 10 Pa. If the oxygen partial pressure is to low, re-oxidation of the dielectric layer 2 becomes difficult, while if too high, the internal electrode layers 3 tend to be oxidized.

The holding temperature at the time of annealing is preferably not more than 1100° C., in particular 500 to 1100° C. If the holding temperature is too low, the re-oxidation of the dielectric layers becomes insufficient, so the insulation resistance tends to decline and the accelerating lifetime becomes shorter. On the other hand, when the holding temperature is too high, not only do the internal electrode layers oxidize and the capacity fall, but also the internal electrode layers end up reacting with the dielectric material resulting in a tendency toward deterioration of the capacity-temperature characteristic, a fall in the insulation resistance, and a fall in the accelerating lifetime. Note that the annealing may be comprised of only a temperature raising process and temperature reducing process. In this case, the temperature holding time becomes zero and the holding temperature is synonymous with the maximum temperature.

The various conditions other than the above conditions in annealing are that a temperature holding time is preferably 0 to 20 hours, in particular 6 to 10 hours, the cooling rate is preferably 50 to 500° C./hour, in particular 100 to 300° C./hour. As the atmospheric gas for annealing, for example, wet $N_2$ gas is preferable.

Note that in the same way as in the above firing, in the processing for removing the binder and the annealing, for example, a wetter etc. may be used to wet the $N_2$ gas or mixed gas. In this case, the temperature of the water is preferably 5 to 75° C.

The processing for removing the binder, firing, and annealing may be performed consecutively or independently. When performing these consecutively, preferably, after processing to remove the binder, the atmosphere is changed without cooling, then the temperature is raised to the holding temperature for firing, the firing performed, then cooled, the atmosphere is changed when the holding temperature of the annealing is reached, and then annealing is performed. On the other hand, when performing these independently, as to firing, it is preferable that the temperature is raised to the holding temperature at the time of the processing for removing the binder in an $N_2$ gas or wet $N_2$ gas atmosphere, then the atmosphere is changed and the temperature is further raised. Preferably, the chip is cooled to the holding temperature of the annealing, then the atmosphere changed again to an $N_2$ gas or wet $N_2$ gas atmosphere and the cooling continued. Further, at the time of annealing, the temperature may be raised to the holding temperature in an $N_2$ gas atmosphere, then the atmosphere changed or the entire annealing process may be performed in a wet $N_2$ gas atmosphere.

The thus obtained capacitor device body is, for example, end polished using barrel polishing or sandblasting etc., then printed or transferred with an external electrode paste and fired to form the external electrodes 4. The firing conditions of the external electrode paste are, for example, preferably 600 to 800° C. for 10 minutes to 1 hour or so in a wet mixed gas of $N_2$ and $H_2$. Further, in accordance with need, the surfaces of the external electrodes 4 may be formed with a covering layer (pad layer) using plating technique, etc.

The thus produced multi-layer ceramic capacitor 1 of the present embodiment has an excellent capacity-temperature characteristics and an improved accelerating lifetime of insulation resistance, thus the credibility improves.

The thus produced multi-layer ceramic capacitor 1 is mounted by soldering, etc. onto a printed circuit board for use in various types of electronic equipment.

Note that an embodiment of the present invention was explained as above, however, the present invention is not limited to the above embodiment and may be modified in various ways within the scope of the invention.

For example, the dielectric ceramic composition obtained by a production method according to the present invention is not limited to be used for a multi-layer ceramic capacitor and may be used for an electronic device wherein a dielectric layer is formed.

Next, examples wherein the embodiment of the present invention is described more specifically and the present invention will be explained further in detail. Note that the present invention is not limited to the embodiments.

EXAMPLE 1

In the present embodiment, samples of a multi-layer ceramic capacitor are prepared by the procedure explained below. Respective pastes below were prepared first.

Dielectric Layer Paste

At first, as starting materials for preparing dielectric material, a main component source material ($SrCO_3$, $CaCO_3$, $TiO_2$) and the first to fourth subcomponents source materials respectively having an average particle diameter of 0.1 to 1 $\mu$m were prepared. In the present embodiment, carbonate (the second subcomponent: $MnCO_3$) was used for a material of MnO, and oxides (the first subcomponent: $V_2O_5$, the third subcomponent: $SiO_2$+CaO, the fourth subcomponent: $Y_2O_3$) were used as other materials.

Next, the main component source material ($SrCO_3$, $CaCO_3$ and $TiO_2$) measured by a predetermined amount so as to attain m' shown in Table 1 to Table 4 and a predetermined amount of $Y_2O_3$ were mixed and dried to obtain powder before calcining. Note that the adding amounts of $Y_2O_3$ shown in Table 1 to Table 4 are mole values by a Y conversion with respect to 100 moles of the main component of the final composition.

Then, a substance obtained by calcining on the powder body is grinded by an alumina roll to obtain a powder body after calcining (composition source material).

The calcining was carried out under conditions that the temperature rising rate was 300° C./hour, a holding time was 1100° C., a temperature holding time was 2 hours in the air atmosphere.

Next, a predetermined amounts of $V_2O_5$, $MnCO_3$, ($SiO_2$+CaO) and $Y_2O_3$ are added, furthermore, predetermined amounts of $SrCO_3$, $CaCO_3$ and $TiO_2$ are added to the powder body after calcining, which were measured so that the composition after firing becomes the blending ratio shown in the respective samples in Table 1 to Table 4 in $\{(Sr_{0.64} Ca_{0.36})O\}_{m'} \cdot TiO_2$ (main component)+$V_2O_5$ (first subcomponent)+$MnCO_3$ (second subcomponent)+($SiO_2$+CaO) (third subcomponent)+$Y_2O_3$ (fourth subcomponent).

Then dielectric ceramic composition source materials of the final composition was obtained by performing wet mixing using a ball mill for 16 hours and drying, respectively.

A dielectric layer paste was prepared by mixing by a ball mill to make a paste 100 parts by weight of the thus obtained dielectric ceramic composition source material, 4.8 parts by weight of acrylic resin, 40 parts by weight of methylene chloride, 20 parts by weight of ethyl acetate, 6 parts by weight of mineral spirits and 4 parts by weight of acetone.

Internal Electrode Paste

Then, an internal electrode paste was obtained by kneading using a triple-roll to make a paste 100 parts by weight of Ni particles having an average particle size of 0.2 to 0.8 $\mu$m, 40 parts by weight of an organic vehicle (8 parts by weight of an ethyl cellulose resin dissolved in 92 parts by weight of butyl carbitol), and 10 parts by weight of butyl carbitol.

External Electrode Layer Paste

An external electrode paste was prepared by kneading together to make a paste 100 parts by weight of Cu particles having an average particle size of 0.5 $\mu$m, 35 parts by weight of an organic vehicle (8 parts by weight of an ethyl cellulose resin dissolved in 92 parts by weight of butyl carbitol), and 7 parts by weight of butyl carbitol.

Preparation of Green Chip

Next, the above dielectric layer paste was used to form a green sheet having a thickness of 6 $\mu$m on a PET film. An internal electrode paste was printed on this, then the green sheet was peeled from the PET film.

Next, the thus obtained green sheets and protection green sheet (on which the internal electrode layer paste is not printed) were layered, adhered by a pressure to prepare a green chip. The number of layered layers of the green sheet having the internal electrode was four.

Then, the green chip was cut to a predetermined size and was processed to remove the binder, fired, and annealed (heat treatment). The process of removing the binder was performed under conditions that a time of temperature rise was 15° C./hour, a holding temperature was 280° C., a holding time was 8 hours and in the air atmosphere. Firing was performed under the conditions that the rate of temperature rise was 200° C./hour, a holding temperature was 1200 to 1380° C., a holding time was 2 hours, the rate of cooling was 300° C./hour, and in an atmosphere of wet mixed gas of $N_2$+$H_2$ (an oxygen partial pressure was $1 \times 10^{-6}$ Pa in samples 4, 4-1, 4-2, 5, 5-1, 19, 19-1 to 19-13 and $5 \times 10^{-6}$ Pa in other samples). Annealing was performed under the conditions that a holding temperature was 900° C., a temperature holding time was 9 hours, the rate of cooling was 300° C./hour and in a wet $N_2$ gas atmosphere (an oxygen partial pressure was $3.54 \times 10^{-2}$ Pa). Note that a wetter having a water temperature of 35° C. was used for wetting the atmosphere gases at the time of firing and annealing.

Next, external electrodes were formed by polishing the end faces of the multi-layer ceramic fired body by sandblasting, then transferring the external electrode paste to the end faces and firing them in a wet $N_2$+$H_2$ atmosphere at 800° C. for 10 minutes, so as to obtain a sample of a multi-layer ceramic capacitor 1 having the configuration as shown in FIG. 1.

The size of the thus obtained respective samples was 3.2 mm×1.6 mm×0.6 mm, the number of dielectric layers sandwiched by the internal electrode layers was 4 and the thickness thereof was 4 $\mu$m, and the thickness of the internal electrode layer was 1.5 $\mu$m. The characteristics below of the respective samples were evaluated.

Dielectric Constant ($\epsilon$) and Insulation Resistance (IR)

The electrostatic capacity of each of the samples of the capacitors was measured under conditions of a frequency of 1 kHz and an input signal level (measurement voltage) of 1 Vrms at a reference temperature of 25° C. by a digital LCR meter (4274A made by YHP). Further, the relative dielectric constant (no unit) was calculated from the obtained electrostatic capacity, electrode dimensions of the capacitor sample, and thickness of dielectric layers.

Next, using an insulation resistance meter (R8340A made by Advantest), the insulation resistance IR after applying 50V DC to the capacitor sample at 25° C. for 60 seconds was measured. The specific resistance ρ (unit: Ωcm) was calculated from the measured value and the electrode area and thickness of the dielectric layers. The results are shown in Table 1 to Table 4.

For evaluation, the dielectric constant ε is important for preparing a small sized high dielectric constant capacitor. One of at least 180, more preferably at least 200, is considered good. The specific resistance of at least $1\times10^{12}$ Ωcm is considered good. The dielectric constant ε was defined as the averages of 10 capacitors of each sample. The specific resistance ρ was defined as the averages of 10 capacitors of good sample.

Temperature Characteristics of Capacitance

The electrostatic capacity at 1 kHz and a voltage of 1V was measured for each sample of the capacitors. It was investigated if the rate of change of the electrostatic capacity with respect to temperature was −2000 to 0 ppm/° C. in a temperature range of 20 to 85° C. when making the reference temperature 20° C. Those which fulfill are checked o and those which do not fulfill were checked x. The results are shown in Table 1 to 4.

Highly Accelerated Life Time (HALT)

A highly accelerated life time was measured by keeping the capacitor samples in a state being applied a direct current voltage of 8V/μm at 200° C. Measurement of the highly accelerated life time was performed on 10 capacitor samples (a thickness of the dielectric layer was 4 μm) and an average lifetime was measured for evaluation. The results are shown in Table 1 to 4.

As evaluation, the highly accelerated life time is particularly important at the time of making the dielectric layer a thin layer, and the lifetime was defined a time from a start of applying until when the

TABLE 1

| Sample No. | | Powder body before calcining | | | Powder body before firing | | | | | |
|---|---|---|---|---|---|---|---|---|---|---|
| | | Main component source material | Fourth subcomponent source material | | Calcining temp. | Subsequently added amount of main component source material | | | Fourth subcomponent source material | | Firing temp. |
| | | m' | R Kind | Mole | (° C.) | Sr | Ca | Ti | R Kind | Mole | (° C.) |
| 1 | Example | 1.02 | Y | 0.07 | 1100 | 0 | 0 | 0 | — | — | 1380 |
| 2 | Example | 0.985 | Y | 0.07 | 1100 | 2.24 | 1.26 | 0 | — | — | 1380 |
| 3 | Example | 1 02 | — | — | 1100 | 0 | 0 | 0 | Y | 0.07 | 1380 |

| Sample No. | | After firing Main component final m | Dielectric constant ε | Specific resistance ρ (Ω cm) | temperature coefficient of capacitance | Highly accelerated lifetime (hour) |
|---|---|---|---|---|---|---|
| 1 | Example | 1.02 | 208 | 5E + 13 | ○ | 124 |
| 2 | Example | 1.02 | 210 | 4E + 13 | ○ | 198 |
| 3 | Example | 1.02 | 213 | 5E + 13 | ○ | 41 |

Mole value of first subcomponent ($V_2O_5$) converted to V = 0.2 mole
Mole value of second subcomponent ($MnCO_3$) converted to Mn = 0.37 mole
Mole value of third subcomponent ($SiO_2$ + CaO) = (2.5 + 2.5) moles

TABLE 2

| Sample No. | | Powder body before calcining | | | Powder body before firing | | | | | |
|---|---|---|---|---|---|---|---|---|---|---|
| | | Main component source material | Fourth subcomponent source material | | Calcining temp. | Subsequently added amount of main component source material | | | Fourth subcomponent source material | | Firing temp. |
| | | m' | R Kind | Mole | (° C.) | Sr | Ca | Ti | R Kind | Mole | (° C.) |
| 4 | Comparison Example | 0.985 | Y | 0.07 | 1100 | 0 | 0 | 4.5 | — | — | 1220 |
| 4-1 | Comparison Example | 0.985 | — | — | 1100 | 0 | 0 | 0 | Y | 0.07 | 1240 |
| 4-2 | Example | 0.985 | Y | 0.07 | 1100 | 0 | 0 | 0 | — | — | 1240 |
| 5 | Example | 0.985 | Y | 0.07 | 1100 | 0.64 | 0 36 | 0 | — | — | 1220 |
| 5-1 | Comparison Example | 0.985 | — | — | 1100 | 0.64 | 0.36 | 0 | Y | 0.07 | 1220 |
| 6 | Example | 0.985 | Y | 0.07 | 1100 | 1.28 | 0.72 | 0 | — | — | 1340 |
| 6-1 | Comparison Example | 0.985 | — | — | 1100 | 1.28 | 0.72 | 0 | Y | 0.07 | 1340 |
| 2 | Example | 0.985 | Y | 0.07 | 1100 | 2.24 | 1.26 | 0 | — | — | 1380 |
| 2-1 | Comparison Example | 0.985 | — | — | 1100 | 2.24 | 1.26 | 0 | Y | 0.07 | 1380 |
| 7 | Comparison Example | 0.985 | Y | 0.07 | 1100 | 6.08 | 3.42 | 0 | — | — | 1380 |

TABLE 2-continued

| Sample No. | | After firing Main component final m | Dielectric constant ε | Specific resistance ρ (Ωcm) | temperature coefficient of capacitance | Highly accelerated lifetime (hour) |
|---|---|---|---|---|---|---|
| 4 | Comparison Example | 0.94 | —* | —* | —* | —* |
| 4-1 | Comparison Example | 0.985 | 235 | 4E + 13 | ○ | 146 |
| 4-2 | Example | 0.985 | 240 | 3E + 13 | ○ | >500 |
| 5 | Example | 0.995 | 214 | 5E + 13 | ○ | 82 |
| 5-1 | Comparison Example | 0.995 | 206 | 5E + 13 | ○ | 56 |
| 6 | Example | 1.005 | 209 | 6E + 13 | ○ | 115 |
| 6-1 | Comparison Example | 1.005 | 214 | 5E + 13 | ○ | 30 |
| 2 | Example | 1.02 | 210 | 4E + 13 | ○ | 198 |
| 2-1 | Comparison Example | 1.02 | 207 | 5E + 13 | ○ | 45 |
| 7 | Comparison Example | 1.08 | —** | —** | —** | —** |

Mole value of first subcomponent ($V_2O_5$) converted to V = 0.2 mole
Mole value of second subcomponent ($MnCO_3$) converted to Mn = 0.37 mole
Mole value of third subcomponent ($SiO_2$ + CaO) = (0.4 + 0.4) moles in samples 4, 4-1, 4-2 and 5-1 and (2.5 + 2.5) moles in other samples
*semiconductive,
**densification not possible

TABLE 3

| Sample No. | | Powder body before calcining | | | | Powder body before firing | | | | | |
|---|---|---|---|---|---|---|---|---|---|---|---|
| | | Main component source material m' | Fourth subcomponent source material | | Calcining temp. (° C.) | Subsequently added amount of main component source material | | | Fourth subcomponent source material | | Firing temp. (° C.) |
| | | | R Kind | Mole | | Sr | Ca | Ti | R Kind | Mole | |
| 8 | Comparison Example | 0.985 | Y | 0 | 1100 | 2.24 | 1.26 | 0 | — | — | 1380 |
| 9 | Example | 0.985 | Y | 0.02 | 1100 | 2 24 | 1.26 | 0 | — | — | 1380 |
| 2 | Example | 0.985 | Y | 0.07 | 1100 | 2.24 | 1.26 | 0 | — | — | 1380 |
| 10 | Example | 0.985 | Y | 0.14 | 1100 | 2.24 | 1.26 | 0 | — | — | 1380 |
| 11 | Example | 0.985 | Y | 0.2 | 1100 | 2.24 | 1.26 | 0 | — | — | 1380 |
| 12 | Example | 0.985 | Y | 1.8 | 1100 | 2 24 | 1.26 | 0 | — | — | 1380 |
| 13 | Reference Example | 0 985 | Y | 2 | 1100 | 2.24 | 1.26 | 0 | — | — | 1380 |

| Sample No. | | After firing Main component final m | Dielectric constant ε | Specific resistance ρ (Ωcm) | temperature coefficient of capacitance | Highly accelerated lifetime (hour) |
|---|---|---|---|---|---|---|
| 8 | Comparison Example | 1.02 | 216 | 4E + 13 | ○ | 35 |
| 9 | Example | 1.02 | 209 | 5E + 13 | ○ | 72 |
| 2 | Example | 1.02 | 210 | 4E + 13 | ○ | 198 |
| 10 | Example | 1.02 | 214 | 5E + 13 | ○ | 184 |
| 11 | Example | 1.02 | 211 | 4E + 13 | ○ | 175 |
| 12 | Example | 1.02 | 208 | 1E + 13 | ○ | 113 |
| 13 | Reference Example | 1.02 | —* | —* | —* | —* |

Mole value of first subcomponent ($V_2O_5$) converted to V = 0.2 mole
Mole value of second subcomponent ($MnCO_3$) converted to Mn = 0.37 mole
Mole value of third subcomponent ($SiO_2$ + CaO) = (2.5 + 2.5) moles
*semiconductive

TABLE 4

| Sample No. | | Powder body before calcining | | | | Powder body before firing | | | | | |
|---|---|---|---|---|---|---|---|---|---|---|---|
| | | Main component source material | Fourth subcomponent source material | | Calcining temp. (° C.) | Subsequently added amount of main component source material | | | Fourth subcomponent source material | | Firing temp. (° C.) |
| | | m' | R Kind | Mole | | Sr | Ca | Ti | R Kind | Mole | |
| 14 | Comparison Example | 0.94 | Y | 0.07 | 1100 | 7.68 | 4.32 | 0 | — | — | 1380 |
| 15 | Example | 0.94 | Y | 0.07 | 1100 | 5.12 | 2.88 | 0 | — | — | 1380 |
| 16 | Example | 0.995 | Y | 0.07 | 1100 | 1.6 | 0.9 | 0 | — | — | 1380 |
| 17 | Example | 1.005 | Y | 0.07 | 1100 | 0.96 | 0.54 | 0 | — | — | 1380 |
| 1 | Example | 1.02 | Y | 0.07 | 1100 | 0 | 0 | 0 | — | — | 1380 |
| 18 | Comparison Example | 1.08 | Y | 0.07 | 1100 | 0 | 0 | 6 | — | — | 1380 |

| Sample No. | | After firing Main component final m | Dielectric constant $\epsilon$ | Specific resistance $\rho$ ($\Omega$cm) | temperature coefficient of capacitance | Highly accelerated lifetime (hour) |
|---|---|---|---|---|---|---|
| 14 | Comparison Example | 1.02 | —* | —* | —* | —* |
| 15 | Example | 1.02 | 218 | 4E + 13 | ○ | 240 |
| 16 | Example | 1.02 | 211 | 6E + 13 | ○ | 168 |
| 17 | Example | 1.02 | 210 | 5E + 13 | ○ | 131 |
| 1 | Example | 1.02 | 208 | 5E + 13 | ○ | 124 |
| 18 | Comparison Example | 1.02 | 209 | 5E + 13 | ○ | 32 |

Mole value of first subcomponent ($V_2O_5$) converted to V = 0.2 mole
Mole value of second subcomponent ($MnCO_3$) converted to Mn = 0.37 mole
Mole value of third subcomponent ($SiO_2$ + CaO) = (2.5 + 2.5) moles
*semiconductive Mole values of amounts of subsequent adding of the main component in Table 1 to Table 4 and mole values of the first to fourth subcomponents are ratios with respect to 100 moles of the final composition of the main component. Also in Table 1 to Table 4, mE+n indicates $m \times 10^{+n}$ in the specific resistance ($\rho$) values.

From the results shown in Table 1, the facts below are confirmed as to a timing of adding the fourth subcomponent. In all of samples 1 to 2, $Y_2O_3$ (the fourth subcomponent source material) is added when compounding $\{(Sr_{0.64}Ca_{0.36})O\}_{m'}\cdot TiO_2$ (the main component source material), that is before calcining the main component source material, to obtain a composition source material wherein the fourth subcomponent source material is brought to react with the main component source material, then, $V_2O_5$, $MnCO_3$ and (SiO+CaO) (the first to third subcomponents source materials) are added and fired.

While, in a sample 3, the fourth subcomponent source material is added together with the first to third subcomponents source materials after compounding the main component source material, that is after calcining the main component source material, and firing is performed.

In comparison of the sample 1 and sample 3, the highly accelerated life time (accelerating lifetime of insulation resistance) is insufficient when adding the fourth subcomponent source material after calcining the main component source material as in the sample 3. On the other hand, it was confirmed that when adding the fourth subcomponent source material to bring reaction before calcining the main component source material as in the sample 1, a dielectric ceramic composition having a sufficient specific dielectric constant, insulation resistance (specific resistance) and excellent resistance to reducing, which is not reduced by being fired in a reducing atmosphere and wherein nickel as an internal electrode material is not oxidized, is obtained. Also, it was confirmed that capacity-temperature characteristics were excellent and the highly accelerated life time (accelerating lifetime of insulation resistance) is improved about three times as much as that of the sample 3.

In comparison of the sample 1 and sample 2, it was confirmed in the sample 2 where the final m of the main component with respect to the source material m' satisfies m'<m that the highly accelerated life time (accelerating lifetime of insulation resistance) can be improved about 1.5 times as much as that in the sample 1 wherein the final m is equal to the source material m'.

It was confirmed in the sample 2 that the highly accelerated life time (accelerating lifetime of insulation resistance) can be improved about 5 times as much as that in the sample 3.

From the results shown in Table 2, the facts below were confirmed as to the final value m of the main component. When m=0.94 as in sample 4, the dielectric is reduced by firing in a reducing atmosphere and a sufficient insulation resistance could not be obtained even if the fourth subcomponent source material is brought to react with the main component source material in advance. While, when m=1.08 as in sample 7, a densified sintered body could not be obtained even if the fourth component source material was brought to react with the main component source material or if firing was performed at 1380° C. (high temperature).

On the other hand, in comparison of sample 5 and sample 5-1, even if m=0.995 which is relatively high as in the sample 5, Y or $Y_2O_3$ was uniformly distributed in grains by using the material wherein the fourth subcomponent source material had reacted with the main component source material in advance, as a result, the highly accelerated life time was improved about 1.5 times as much as that of the sample 5-1. In comparison of sample 6 and sample 6-1, even if m=1.005 which is relatively high as in the sample 6, Y or $Y_2O_3$ was uniformly distributed in grains by using the material wherein the fourth subcomponent source material had reacted with the main component source material in advance, as a result, the highly accelerated life time was improved about 4 times as much as that of the sample 6-1. In comparison of sample 2 and sample 2-1, even if m=1.02 which is relatively high as in the sample 6, by using the material wherein the fourth subcomponent source material is brought to react with the main component source material in advance, the highly accelerated life time was improved about more than 5 times as much as that of the sample 2-1 in the same way.

Note that in sample 5 and sample 5-1, even though the timing of adding the fourth subcomponent source material differs, the source material m'=0.985 and the final m=0.995 in the main component in both cases. In sample 6 and sample 6-1, the source material m'=0.985 and the final m=1.005 in the main component in both cases. In sample 2 and sample 2-1, the source material m'=0.985 and the final m=1.02 in the main component in both cases. Namely, the final value m becomes larger in an order from (sample 2 and sample 2-1), (sample 6 and sample 6-1) and (sample 5 and sample 5-1). Due to the difference, the highly accelerated life time is improved in the sample 5 about 1.5 times as much as that in the sample 5, about 3 times in the sample 6 as much as that in the sample 6-1 and about 5 times in the sample 2 as much as that in the sample 2-1. Accordingly, it was confirmed that the larger the final value m in the main component, the more remarkable the effects on improving the lifetime in the samples (sample 5, sample 6 and sample 2) wherein the fourth subcomponent source material is added to react with the main component source material before calcining.

Also, in comparison of sample 4-1 and sample 4-2, even if m=0.985 which is relatively high as in the sample 4-2, Y or $Y_2O_3$ was uniformly distributed in grains by using the source material wherein the fourth subcomponent source material had reacted with the main component source material in advance, as a result, the highly accelerated life time was improved about 3 times or more as much as that of the sample 4-1. As a result, it was confirmed that those which use the material wherein the fourth subcomponent source material is brought to react with the main component source material showed effectiveness on improving the highly accelerated life time even if the final m is relatively low in the main component.

From the results shown in Table 3, the facts below were confirmed as to the adding amount of the fourth subcomponent source material. When Y is not added at all as in sample 8 or the adding amount of Y is 2 moles as in sample 13, there was no improvement in the highly accelerated life time (accelerating lifetime of insulation resistance). On the other hand, in the samples 2 to 6 containing a predetermined amount of the fourth subcomponent, even if m=1.02 which is relatively high, a dielectric ceramic composition having a sufficient specific dielectric constant, insulation resistance (specific resistance) and resistance to reducing, which is not reduced by firing in a reducing atmosphere and wherein nickel as an internal electrode material is not oxidized was obtained. Also, the capacity-temperature characteristics were excellent and the highly accelerated life time (accelerating lifetime of insulation resistance) was also improved.

From the results shown in Table 4, the facts below were confirmed as to the source material value m' of the main component. When m'=0.9 as in sample 14, the dielectric was reduced by firing in a reducing atmosphere and sufficient insulation resistance could not be obtained even if the fourth subcomponent source material had reacted with the main component source material in advance. When m'=1.08 as in sample 18, there was no effects of improving the high temperature lifetime even if the fourth subcomponent source material had reacted with the main component source material in advance.

Note that in samples 15 to 17 and sample 1, the final m=1.02 in the main component, but the source material value m' of the main component becomes less in an order from the sample 1, sample 17, sample 16 and sample 15. On the other hand, the highly accelerated life time becomes larger in an order from the sample 1, sample 17, sample 16 and sample 15. Accordingly, it was confirmed in the samples wherein the fourth subcomponent source material was added to react with the main component source material before calcining, the smaller the source material value m' of the main component, that is the larger the difference from the final value m, the more improved the lifetime becomes.

EXAMPLE 2

The mole value of the first subcomponent was set to be 0.2 mole (converted to V), the second subcomponent 0.37 mole (converted to Mn) and the third subcomponent (2.5+2.5) moles, and a kind of R as the fourth subcomponent was changed as shown in Table 5. These were added to the powder body before calcining by 0.07 mole converted to rare-earth element in an oxide and calcining was performed. The annealing temperature was set at 1100° C. and the holding time was three hours. A plurality of capacitor samples were produced in this way and a defect rate of the initial insulation resistance (IR) thereof was calculated. The results are shown in Table 5.

TABLE 5

| | | Powder body before calcining | | | | Powder body before firing | | | | | After firing | Initial |
| | | Main component source material | Fourth subcomponent source material | | Calcining temp. | Subsequently added amount of main component source material | | | Fourth subcomponent source material | | Firing temp. | Main component final | IR defect rate |
| Sample No. | | m' | R Kind | Mole | (° C.) | Sr | Ca | Ti | R Kind | Mole | (° C.) | m | (%) |
| 19 | Example | 0.985 | Y | 0.07 | 1100 | 0 | 0 | 0 | — | — | 1220 | 0.985 | 50 |
| 19-1 | Example | 0.985 | Sc | 0.07 | 1100 | 0 | 0 | 0 | — | — | 1220 | 0.985 | 60 |
| 19-2 | Example | 0.985 | Ce | 0.07 | 1100 | 0 | 0 | 0 | — | — | 1220 | 0.985 | 67 |

TABLE 5-continued

| | | Powder body before calcining | | | | Powder body before firing | | | | | |
|---|---|---|---|---|---|---|---|---|---|---|---|
| | | Main component source material | Fourth subcomponent source material | | Calcining temp. | Subsequently added amount of main component source material | | | Fourth subcomponent source material | | Firing temp. | After firing Main component final | Initial IR defect rate |
| Sample No. | | m' | R Kind | Mole | (° C.) | Sr | Ca | Ti | R Kind | Mole | (° C.) | m | (%) |
| 19-3 | Example | 0.985 | Dy | 0.07 | 1100 | 0 | 0 | 0 | — | — | 1220 | 0.985 | 82 |
| 19-4 | Example | 0.985 | Ho | 0.07 | 1100 | 0 | 0 | 0 | — | — | 1220 | 0.985 | 55 |
| 19-5 | Example | 0.985 | Er | 0.07 | 1100 | 0 | 0 | 0 | — | — | 1220 | 0 985 | 60 |
| 19-6 | Example | 0.985 | Tm | 0.07 | 1100 | 0 | 0 | 0 | — | — | 1220 | 0.985 | 80 |
| 19-7 | Example | 0.985 | Yb | 0.07 | 1100 | 0 | 0 | 0 | — | — | 1220 | 0.985 | 50 |
| 19-8 | Example | 0.985 | Lu | 0.07 | 1100 | 0 | 0 | 0 | — | — | 1220 | 0.985 | 35 |
| 19-9 | Reference Example | 0.985 | Tb | 0.07 | 1100 | 0 | 0 | 0 | — | — | 1220 | 0.985 | 97 |
| 19-10 | Reference Example | 0.985 | Gd | 0.07 | 1100 | 0 | 0 | 0 | — | — | 1220 | 0.985 | 95 |
| 19-11 | Reference Example | 0.985 | Eu | 0.07 | 1100 | 0 | 0 | 0 | — | — | 1220 | 0.985 | 97 |
| 19-12 | Reference Example | 0.985 | Sm | 0.07 | 1100 | 0 | 0 | 0 | — | — | 1220 | 0.986 | 99 |
| 19-13 | Reference Example | 0.985 | La | 0.07 | 1100 | 0 | 0 | 0 | — | — | 1220 | 0.985 | 97 |

Mole value of first subcomponent ($V_2O_5$) converted to V = 0.2 mole
Mole value of second subcomponent ($MnCO_3$) converted to Mn = 0.37 mole
Mole value of third subcomponent ($SiO_2$ + CaO) = (2.5 + 2.5) moles.

From the results shown in Table 5, it was confirmed that a non-defect rate of the initial insulation resistance (IR) was improved and the defect rate of the initial IR was remarkably reduced in a thin layer (thickness of dielectric layers: 4 μm) in the cases where an oxide of Y, Sc, Ce, Dy, Ho, Er, Tm, Yb or Lu are added (sample 19 to sample 19-8) comparing with the cases where an oxide of Tb, Gd, Eu, Sm or La was added (sample 19-9 to sample 19-13).

What is claimed is:

1. A method of producing a dielectric ceramic composition comprising:
    a main component expressed by a composition formula of $\{(Sr_{1-x}Ca_x)O\}_{m} \cdot (Ti_{1-y}Zr_y)O_2$ wherein the mole ratio m satisfies 0.94<m<1.08, the code x satisfies 0≦x≦1.00 and the code y satisfies 0≦y≦0.20; and
    a supplementary component including an oxide of R, where R is at least one selected from Sc, Y, La, Ce, Pr, Nd, Pm, Sm, Eu, Gd, Tb, Dy, Ho, Er, Tm, Yb and Lu;
    the method comprising producing the dielectric ceramic composition by using a composition source material wherein at least a part of a supplementary component source material for the supplementary component is brought to react in advance with a main component source material for the main component, the main component source material being expressed by a composition formula of $\{(Sr_{1-x}Ca_x)O\}_{m} \cdot Ti_{1-y}Zr_y)O_2$ wherein the mole ratio m' with respect to the mole ratio m of the final composition satisfies m'm.

2. The method of producing a dielectric ceramic composition as set forth in claim 1, wherein the oxide of R included in said supplementary component is at least one oxide of Sc, Y, Ce, Dy, Ho, Er, Tm, Yb and Lu.

3. The method of producing a dielectric ceramic composition as set forth in claim 2, wherein the supplementary component source material is brought to react in advance in an amount of 0.02 mole or more and less than 2 moles, calculated as a conversion mole value of the R in the oxide, with respect to 100 moles of the main component source material.

4. The method of producing a dielectric ceramic composition as set forth in claim 1, wherein the supplementary component source material is brought to react in advance in an amount of 0.02 mole or more and less than 2 moles, calculated as a conversion mole value of the R in the oxide, with respect to 100 moles of the main component source material.

5. The method of producing a dielectric ceramic composition as set forth in claim 1, wherein said dielectric ceramic composition is produced by firing after adding to said composition source material a substance containing at least one element of Sr and Ca.

6. A method of producing an electronic device comprising a dielectric layer constituted by a dielectric ceramic composition containing:
    a main component expressed by a composition formula of $\{(Sr_{1-x}Ca_x)O\}_{m} \cdot (Ti_{1-y}Zr_y)O_2$, wherein the mole ratio m satisfies 0.94<m<1.08, the code x satisfies 0≦x≦1.00 and the code y satisfies 0≦y≦0.20; and
    a supplementary component including an oxide of R, where R is at least one selected from Sc, Y, La, Ce, Pr, Nd, Pm, Sm, Eu, Gd, Tb, Dy, Ho, Er, Tm, Yb and Lu;
    the method comprising producing the dielectric ceramic composition by using a composition source material wherein at least a part of a supplementary component source material for the supplementary component is brought to react in advance with a main component source material for the main component, the main component source material being expressed by a composition formula of $\{(Sr_{1-x}Ca_x)O\}_{m} \cdot (Ti_{1-y}Zr_y)O_2$ wherein the mole ratio m' with respect to the mole ratio m of the final composition satisfies m'<m.

7. The method of producing an electronic device as set forth in claim 6, wherein the oxide of R included in said supplementary component is at least one oxide of Sc, Y, Ce, Dy, Ho, Er, Tm, Yb and Lu.

8. The method of producing an electronic device as set forth in claim 6, wherein said dielectric ceramic composition is produced by firing after adding to said composition source material a substance containing at least one element of Sr and Ca.

* * * * *

UNITED STATES PATENT AND TRADEMARK OFFICE
CERTIFICATE OF CORRECTION

PATENT NO. : 6,645,895 B2  
DATED : November 11, 2003  
INVENTOR(S) : Akira Sato et al.

It is certified that error appears in the above-identified patent and that said Letters Patent is hereby corrected as shown below:

Column 23,
Line 54, please delete "m'm" and replace with: -- m'<m --.

Signed and Sealed this

Thirteenth Day of April, 2004

JON W. DUDAS
*Acting Director of the United States Patent and Trademark Office*